United States Patent
Le Goff et al.

(10) Patent No.: US 10,073,930 B2
(45) Date of Patent: Sep. 11, 2018

(54) COMPUTERISED METHOD AND SYSTEM FOR MODELLING AERAULIC FLOWS, IN PARTICULAR FOR THE QUANTITATIVE ASSESSMENT OF THE RISK OF AIRBORNE CONTAMINATION

(71) Applicant: HYGIE-TECH SA, Sion (CH)

(72) Inventors: Philippe Le Goff, Epalinges (CH); Catherine Hugel-Le Goff, Epalinges (CH)

(73) Assignee: HYGIE-TECH SA, Vionnaz (CH)

( * ) Notice: Subject to any disclaimer, the term of this patent is extended or adjusted under 35 U.S.C. 154(b) by 902 days.

(21) Appl. No.: 14/400,249

(22) PCT Filed: Apr. 10, 2013

(86) PCT No.: PCT/IB2013/000645
§ 371 (c)(1),
(2) Date: Nov. 10, 2014

(87) PCT Pub. No.: WO2013/167942
PCT Pub. Date: Nov. 14, 2013

(65) Prior Publication Data
US 2015/0073758 A1    Mar. 12, 2015

Related U.S. Application Data

(60) Provisional application No. 61/645,753, filed on May 11, 2012.

(30) Foreign Application Priority Data

May 11, 2012 (CH) .................................. 00670/12

(51) Int. Cl.
G06F 17/50       (2006.01)
G06F 17/11       (2006.01)

(52) U.S. Cl.
CPC .......... *G06F 17/5018* (2013.01); *G06F 17/11* (2013.01); *G06F 2217/16* (2013.01)

(58) Field of Classification Search
None
See application file for complete search history.

(56) References Cited

U.S. PATENT DOCUMENTS 6,009,741 A * 1/2000 Wagner ............... G06F 17/5018
                                                           73/1.57
2012/0253769 A1 * 10/2012 Poondru ................ F24F 11/006
                                                           703/9

OTHER PUBLICATIONS

Balocco, Carla, "Hospital ventilation simulation for the study of potential exposure to contaminants", Build Simul., 2011, vol. 4, No. 1, pp. 5-20.

(Continued)

*Primary Examiner* — Syed Roni
(74) *Attorney, Agent, or Firm* — Young & Thompson (57) ABSTRACT

Disclosed is a computerized process and system for modeling aeraulic flows in an environment in particular for the evaluation of the risks of airborne contamination. The principle of the process consists in considering that in a given individual unit or mesh, defined as fairly small, the final values of the primitive variables (V, P, T) are the result of their primary values calculated in an irrotational field composed of a "pressure-velocity" coupling with a turbulence model adapted to Newtonian and incompressible fluids belonging to the range of validity of the process.

19 Claims, 7 Drawing Sheets

(56) References Cited

OTHER PUBLICATIONS

McDonough, J. M., "Lectures in Computational Fluid Dynamics of Incompressible flow: Mathematics, Algorithms and Implementations", 2007, XP0055098076, pp. 1-149.

Norton et al., "Computational fluid dynamics (CFD)—an effective and efficient design and analysis tool for the food industry: A review", Trends in Food Science & Technology, 2006, vol. 17, pp. 600-620.

Thompson, M. C., "An Adaptive Multigrid Technique for the Incompressible Navier-Stokes Equations", Journal of Computational Physics, 1989, vol. 82, pp. 94-121.

International Search Report, dated Jan. 30, 2014, from corresponding PCT application.

\* cited by examiner

COMPUTERISED METHOD AND SYSTEM FOR MODELLING AERAULIC FLOWS, IN PARTICULAR FOR THE QUANTITATIVE ASSESSMENT OF THE RISK OF AIRBORNE CONTAMINATION

The invention relates to a computerized process and system for modeling aeraulic flows in an environment in particular for the evaluation of the risks of airborne contamination.

The applications for such a process relate in particular to defense, the protection of sensitive installations, hospitals, clean rooms, sites with a controlled environment, and the following industries: chemical, pharmaceutical, cosmetic, electronic, agricultural, and mechanical.

BACKGROUND OF THE INVENTION

Knowledge and control of aeraulic flows concern one skilled in the art when he seeks to control environmental parameters for purposes of comfort and safety. To attain this objective, two approaches are possible: practical experience or mathematical calculation using recognized physical laws. Traditionally, the two approaches are considered to be competitors, and, most often, the person on the spot will prefer experience when the scientific person will favor calculation. However, neither of these two approaches can claim the quality of absolute precision when it comes to representing an aeraulic flow.

Experimental simulation can only provide a vision of the reality of the flows remaining dependant upon conditions of experience (nature of the tracer, processes for releasing tracer into the environment, aeraulic and operational conditions in the environment being considered at the time of the experiment). Also, if experimental simulation can provide advantageous teaching on the qualitative representation of aeraulic flows, it remains linked to the conditions of experience and should not be extrapolated to other conditions. Moreover, the margin of error of experimental simulation in the case of isolated quantitative study remains very significant and can often be underestimated by the experimenters.

Also, in an application including the concept of risk management, which, by definition, requires the extrapolation of results and their projections in different systems of operational configurations, only the modeling by calculation is theoretically capable of meeting, in an objective manner, requirements of the problem posed. This approach by calculation is known to one skilled in the art under the acronym CFD (CFD: Computational Fluid Dynamics) and relies on the search for digital solutions with approximations of equations of state of fluid dynamics.

In practice, the CFD proceeds according to a principle that is always identical regardless of the method that is implemented. Actually, the known methods all rely on the following stages:

1. Selection of the Equations of State of Fluid Dynamics Adapted to the Problem that is to be Solved The description of the flow of a fluid in movement is controlled by the equations of state, widely known under the name Navier-Stokes equations, to which are added restrictions such as:

Newtonian and incompressible fluid
Constant physical properties
Buoyancy effect controlled by the Boussinesq approximation
Ignored viscous dissipation
Ignored radiation
One-phase fluid
One-component fluid.

These hypotheses and restrictions make it possible, however, to cover a very extensive application.

Under these conditions, the equations of state are written:

Law of conservation of mass $$\nabla \cdot \vec{V} = 0$$

Law of conservation of the quantity of movement $$\frac{\partial \vec{V}}{\partial t} + \vec{V}(\nabla \cdot \vec{V}) = -\frac{1}{\rho}\nabla P + \nu \nabla^2 \vec{V} + \vec{g}\beta(T - T_0) + F_{int}$$

Law of Conservation of Energy:

$$\frac{\partial T}{\partial t} + \vec{V}(\nabla \cdot T) = \frac{k}{\rho C_p}\nabla^2 T + \frac{S_T}{\rho C_p}.$$

The solutions to these equations provide the desired information on the flow variables of the fluid (also called primitive variables), i.e.: the velocity $V = \{u, v, w\}$, the pressure P, and the temperature T.

2. Linearization of the Equations of State with Provision of Approximation Models The mathematical expression of the law of conservation of the quantity of movement reveals a non-linear term that makes the equation impossible to solve in an exact manner. This impossibility is known under the name of "Closure Problem." Consequently, it is necessary to approximate the solution. Numerous models have been proposed with more or less success. Among the latter, the model k-$\varepsilon$ is certainly the most commonly used.

The model k-$\varepsilon$ is based on two equations that take into account the turbulent kinetic energy (k) and the dissipation of the turbulence ($\varepsilon$). In this model, the turbulent viscosity is determined in an empirical manner by the equation:

$$\nu_t = C_\mu \frac{k^2}{\varepsilon}$$

an equation in which $C_\mu$ is a constant (generally 0.09).

In fact, the implementation of the model k-$\varepsilon$ requires the introduction of several other empirical functions such as $F_m$, $F_1$, $F_2$ and E, whose values vary according to the authors.

Consequently, it clearly appears that the conventional methods for modeling aeraulic flows cannot provide exact solutions to the problem posed, and the relevance of the approximated values is neither always verifiable nor even adjustable by the user.

3. Discretization of the Calculation Area for Generating Algebraic Systems that are Capable of Providing—by an Iterative Method—Solutions that are Close to the Equations of these Systems The foundation of the modeling by calculation then relies on a principle of discretization of space and indexing of equations of state modified by the introduction of empirical values. The calculation area is meshed into a finite number of volumes called mesh M whose sum provides the entirety of this range. In each of these meshes, the scalar variables P and T are evaluated.

In addition, three complementary networks offset in the directions of the individual trihedron $\{u, v, w\}$ are attached for the determination of the velocity vector V={u, v, w} along each of the axes. The integration of the partial differential equations in their respective mesh is then obtained by the determination of the term "convection-diffusion."

The algebraic equation can then be resolved at point A of the mesh M for knowing the value of the calculated variable.

It is useful to note that, to be solved, this equation requires knowledge of values of the calculated variables in the adjacent meshes. This interdependence of all of the meshes for building the final result in the calculation area requires the implementation of an iterative process for refining the values in each volume based on values calculated in the adjacent cells until stabilized general solutions are obtained.

4. Transcription of the Iterative Process in Algorithms that can be Treated by a Computerized System The search for convergence of variables in the discretized range requires the use of computerized systems with considerable calculating powers. Actually, the precision of the result that is obtained is conditioned by the size of the mesh: the smaller the latter is, the more precise the result. However, covering the range by small-size meshes has the consequence of increasing the number thereof and therefore of increasing the calculating time necessary for obtaining the result (it should be noted that the increase in the number of meshes is also conditioned by the equipment upon which the calculation is performed and in particular by the size of the memory available for the calculation).

Most of the algorithms making possible this iterative calculation have been developed from the 1960s to the 1980s and have known only a few improvements until today. The most used algorithms in the commercial codes are known under the names of SIMPLE (SIMPLE: Semi-Implicit Method for Pressure Linked Equations), SIMPLER, MAC, and SOLA, the foregoing being a non-exhaustive list.

5. Introduction of Initial Conditions and Boundary Conditions Satisfying Both Requirements of Algorithms and of the Problem Posed Regardless of the algorithm that is used, the implementation requires the introduction of data making it possible to "turn around" the calculation. These data consist of initial conditions and boundary conditions of the calculation area. In the conventional approach of the CFD codes, the algorithm is deployed from meshes in which the values of the primitive variables (V, P, T) are known and are diffused toward all of the adjacent meshes while having to satisfy the boundary conditions defined at the boundaries of this range.

In conventional CFD, the boundary conditions pose the value of the velocity module at the boundary of the range (in general, zero velocity) and develop toward the interior of the range according to the models of Dirichlet or Neumann.

6. System Resolution

The algorithm of a conventional CFD code is then activated until the time when the convergence conditions (or stability of the solution) are satisfied. However, the conventional CFD codes do not use means that are capable of assessing the relevance of the calculated solution. This means that the relevance of the result of the calculation is primarily conditioned by the CFD expert during the selection of the most suitable code for the modeling type to be carried out and, for a given code, by the selection of models and values of the variables as well as by the introduction of the initial conditions.

If this conditionality on the human factor of the calculated solution does not pose a problem in the structures tested in modeling by calculation (in the field of aeronautics, for example), it nevertheless constitutes an obstacle for a routine use by a person on the spot (such as, for example, for the modeling of aeraulic flows in a laboratory) with, as a corollary, the problems of misuse or management of interfaces cited above.

The conventional principle of modeling by calculation of aeraulic flows therefore further promotes CFD codes for applications with high added value and with restricted parametric variability (as in the field of aeronautics) as well as for real configurations (laboratories, public site, . . . ) prevailing within a framework for evaluation of the risk of airborne contamination.

However, the principle presented in detail above is adopted by almost all of the current codes, whether they are made available to the public or kept strictly in house for the organizations that hold the rights thereto.

SUMMARY OF THE INVENTION

The object of this invention is to provide a process making it possible to model the aeraulic flows in an environment that is occupied by a primary fluid that is reliable while being less complex than the known processes as much from the standpoint of necessary technical resources as from the standpoint of knowledge required for a user for its implementation. In particular, the process according to this invention has as its object to make possible the evaluation of the risks of airborne contamination in said area. Another object of this invention is to provide a computerized system and a device for implementing said process.

This invention has as its object a process for modeling aeraulic flows in an environment according to Claim 1.

The process according to the invention is distinguished from any other method of digital calculation of solutions close to the Navier-Stokes equations (case of the conventional CFD "Computational Fluid Dynamics") by the fact that it draws on the better part of the current technical knowledge to integrate it in a mathematical model and thus to considerably reduce the number of iterations necessary for obtaining an acceptable solution in a context of evaluating the risk of airborne contamination.

This approach combined with a relevant meshing of the space makes it possible to develop a method in two consecutive phases in which a primary solution is first of all calculated in each mesh and then a coupling algorithm is deployed in all of the meshes to refine the solution.

The principle of the process according to the invention consists in considering that in a given individual volume or mesh, defined as fairly small, the final values of the primitive variables (V, P, T) are the result of their primary values calculated in an irrotational field composed of a "pressure-velocity" coupling with a turbulence model adapted to Newtonian and incompressible fluids belonging to the range of validity of the process.

In addition, by integrating and by parameterizing the data coming from sensors and measuring instruments such as telemetry by a 3D laser scanner used for modeling the range and the interfaces to be studied, the process according to the invention leads to obtaining highly relevant solutions to the extent that they are calculated in an environment that is faithful to the configuration of the interfaces that they model.

Moreover, the process according to the invention can be integrated in a system that is computerized and designed to be usable by a population that is much more vast than that of the experts to whom the conventional CFD software is addressed. This invention therefore also has as its object a computer program according to Claim 15 and a device according to Claim 16 or 17.

Also, by the performance of its calculation method and by its advanced ergonomics, the process and the computerized system according to the invention make possible, in their application, a routine use of modeling by calculation of aeraulic flows when the data obtained by experimental simulation are difficult to generalize or when the conventional CFD processes implemented by computer prove too resource-intensive (memory, performance of the processor, . . . ) to be able to be applied effectively and to offer fast results.

The process according to the invention is in particular particularly well suited for optimizing the design or the performance of a system for extracting and blowing air or an HVAC (HVAC: Heating Ventilation and Air-Conditioning) system in a building having strict specifications in terms of air treatment or for control of the risk of airborne contamination. Actually, these two objectives are poorly adapted, for reasons of cost or safety, for treatment by experimentation or the implementation of calculation means that are cumbersome and not very accessible to technicians who are directly responsible for problems facing them, whereas one skilled in the art knows that the accumulation of interfaces with different expertise levels in technologies can take away from the relevance of the global nature of the process or else even have a negative impact on the preservation of the confidentiality of the information.

After having modeled the aeraulic flows of the study environment, the process according to the invention also makes it possible to calculate the conditional probability (called likelihood) of having a quantity of contaminant, for example a collection of particles or a concentration of gas, present in a given volume of the environment at a given time.

Thus, in a defined environment or area and using the process according to the invention, one skilled in the art may know in a precise and fast manner not only the modes of aeraulic flow in this environment but also the possible profiles for dispersion of an airborne substance with the associated quantifications in the space and time magnitudes.

BRIEF DESCRIPTION OF THE DRAWINGS

An embodiment of the process according to the invention will now be described in detail by way of example with reference to the accompanying figures.

FIG. 2b illustrates a modeling of the study environment in the form of a cloud of points obtained from the result of FIG. 2a.

FIGS. 5a to 5d illustrate a display example of the results obtained by the process according to the invention.

DETAILED DESCRIPTION OF THE PREFERRED EMBODIMENTS

Figure 1:
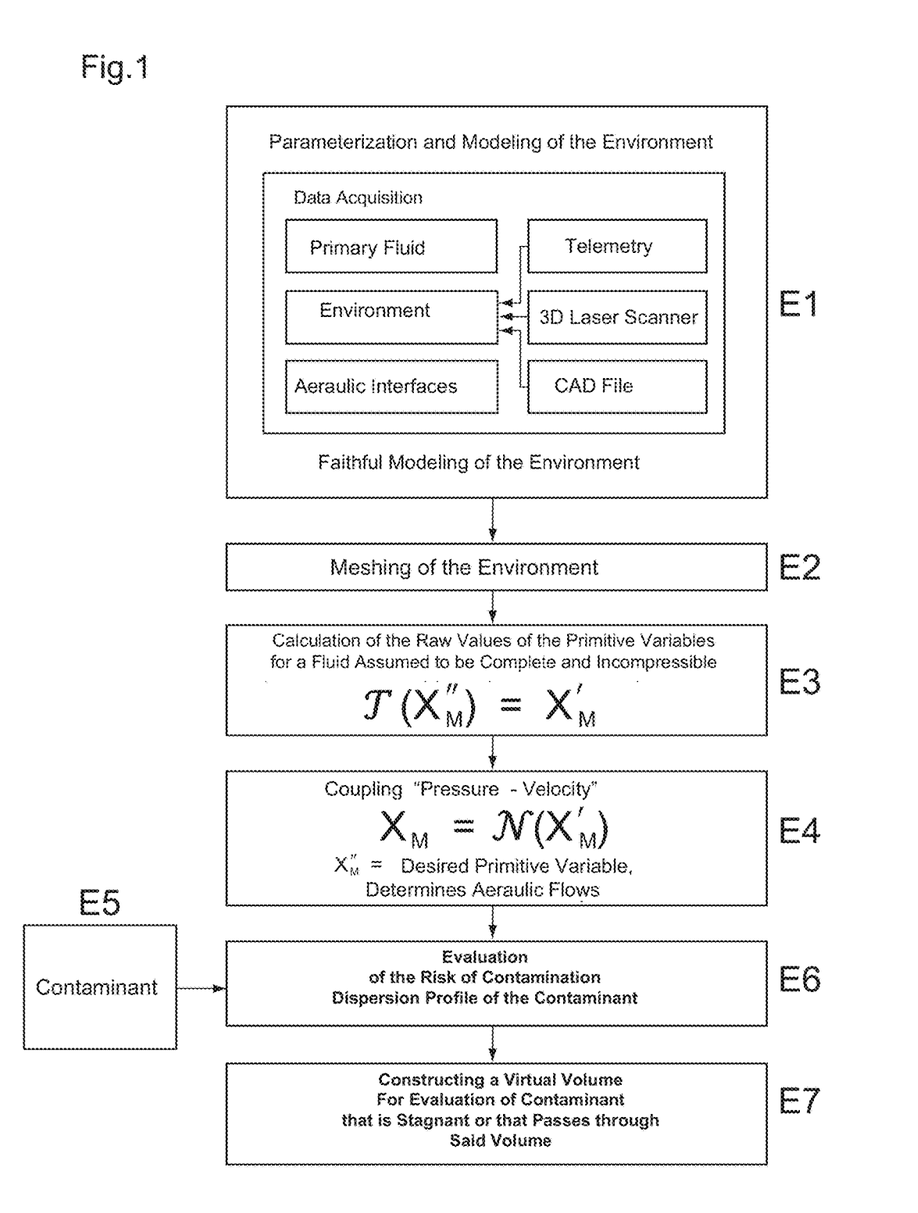
FIG. 1 is a diagram illustrating the stages of the process according to the invention.

With reference to FIG. 1, the process according to the invention comprises stages E1 to E7.

The first stage E1 of the process according to the invention consists in parameterizing and in modeling the study environment in which it is desired to model the aeraulic flows.

To do this, it is necessary to summarize the essential data relative to the study environment. These data comprise in particular the physical and dynamic characteristics of the environment such as the installation of solid surfaces, the materials that are used, the thermal balance, or the local thermal insularities. These data can be acquired by telemetry, by scanning the environment by means of a 3D laser scanner or by any other suitable sensor, for example, or from preestablished environmental plans that are contained in, for example, a CAD (computer-aided design) file. These data are then used to produce a faithful three-dimensional model of the study environment.

Said environment can be, for example, a laboratory, a clean room, an office, a public site such as a hospital or an airport concourse, or any other environment in which it is desired to model the aeraulic flows.

Below and for facilitating the description of the process according to the invention, it is assumed that the study environment is an inside environment and that the fluid occupying this environment is air.

Figure 2A:
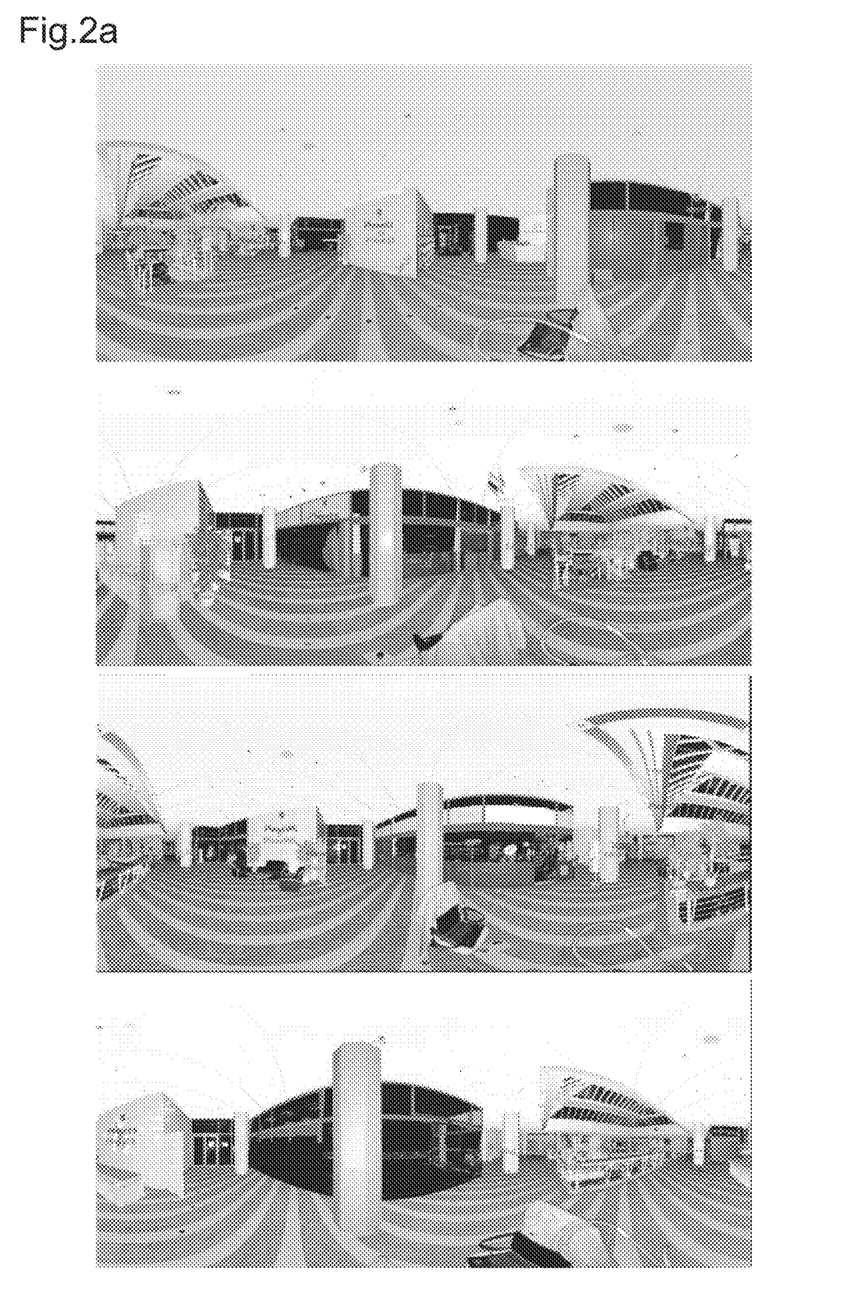
FIG. 2a illustrates the result of a sweep or scan of the study environment using a 3D laser scanner in four different positions and orientations.
Figure 2B:
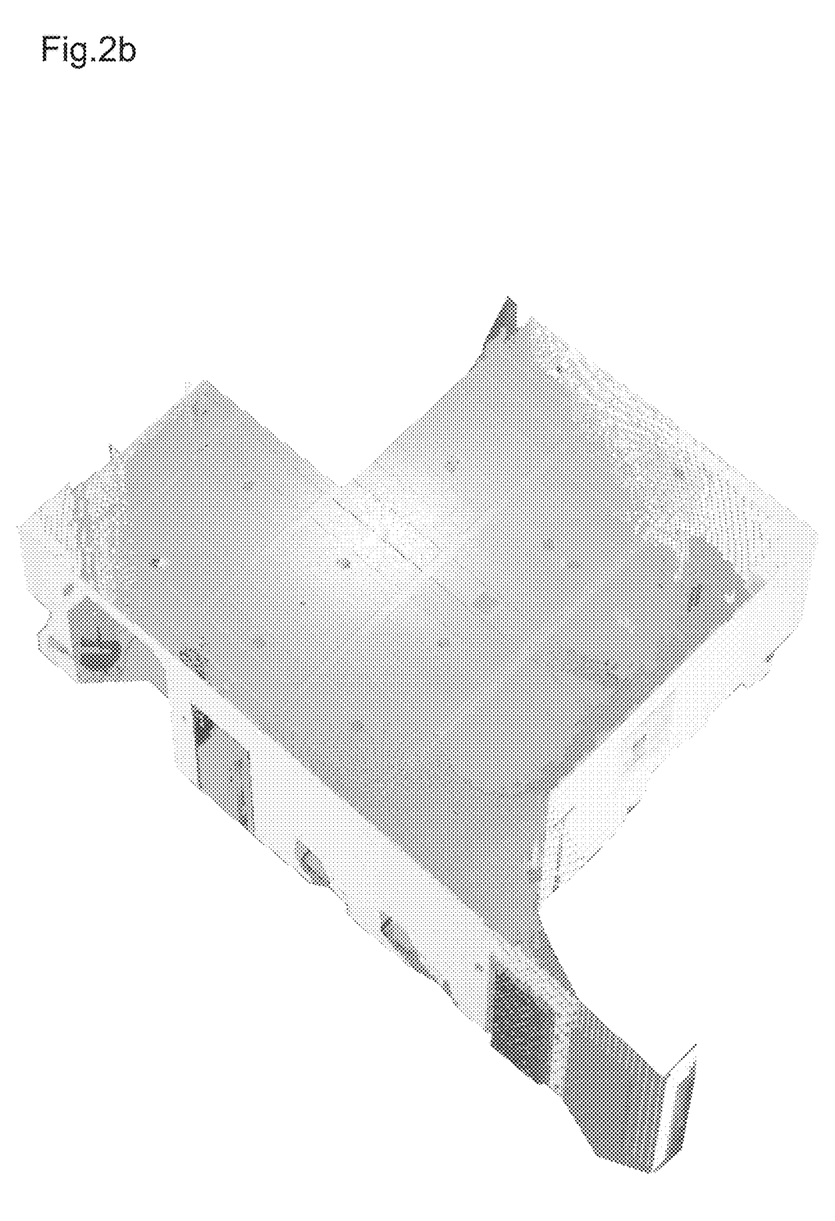

By an example, FIGS. 2a and 2b illustrate a portion of this first stage E1 for an office-type study environment. According to the structural characteristics of the environment, a series of scans/sweeps are produced, for example, using a 3D laser scanner from various positions and in various orientations as illustrated in FIG. 2a. A model of the environment that consists of a cloud of points in three dimensions is then reconstructed using any suitable software as illustrated in, for example, FIG. 2b for the environment of FIG. 2a.

This first stage E1 for modeling the study environment is well known to one skilled in the art and also constitutes an essential stage in the conventional CFD processes.

The use of a 3D scanner and software that then make it possible to reconstruct the surfaces of the study environment as a cloud of points in three dimensions are very common in CFD and are well known to one skilled in the art. These elements will therefore not be discussed in more detail here.

Still in this first stage E1 of the process according to the invention, the technical characteristics of the system for blowing and extracting fluid from the environment—also called an HVAC (heating, ventilation and air-conditioning) system—are then determined. Said system consists of aeraulic interfaces, with the term aeraulic interface referring to any element having a direct influence on the aeraulic flow in the study environment.

The aeraulic interfaces in the study environment comprise in particular:
The blowing openings of a ventilation system;
The openings for extraction or accommodation of a ventilation system;
The surfaces of the environment having a significant thermal differential with the ambient temperature in the environment.

The technical characteristics of the blowing and extraction system comprise in particular the list of aeraulic interfaces that are present and influential in the study environment, the installation of said aeraulic interfaces in the environment, and the aeraulic and climatic characteristics of said aeraulic interfaces.

The aeraulic and climatic characteristics of the aeraulic interfaces being part of an HVAC system are available to one skilled in the art. Actually, the contribution of each aeraulic interface at a given point of the environment, defined by relative coordinates in relation to this interface, can be deduced from specialized technical works such as H. Recknagel, E. Sprenger, and E.-R. Schmarek, Génie Climatique [Climatic Engineering], Dunod, Paris, 2007, 1804 p. (ISBN 978-2-10-048353-2) or files of technical characteristics edited by the respective manufacturers of aeraulic interfaces.

Finally, in this stage E1 for modeling the environment, the characteristics relating to the primary fluid occupying the study environment are also determined. In the case of air, these characteristics depend in particular on the location of the environment: altitude, pollution levels . . . . One skilled in the art will easily identify said characteristics.

It is necessary to note that even if stage E1 of the process according to the invention has been described as a series of sub-stages that have to be carried out, the order of these sub-stages does not, of course, have any significance. It would be possible in particular to begin by summarizing the characteristics of the primary fluid before modeling the study environment.

The study environment constitutes the calculation area in which the aeraulic flows should be modeled, i.e., in which the flow variables of the fluid should be calculated. These variables are called primitive variables and comprise the velocity V={u, v, w}, the pressure P, and the temperature T.

Figure 3:
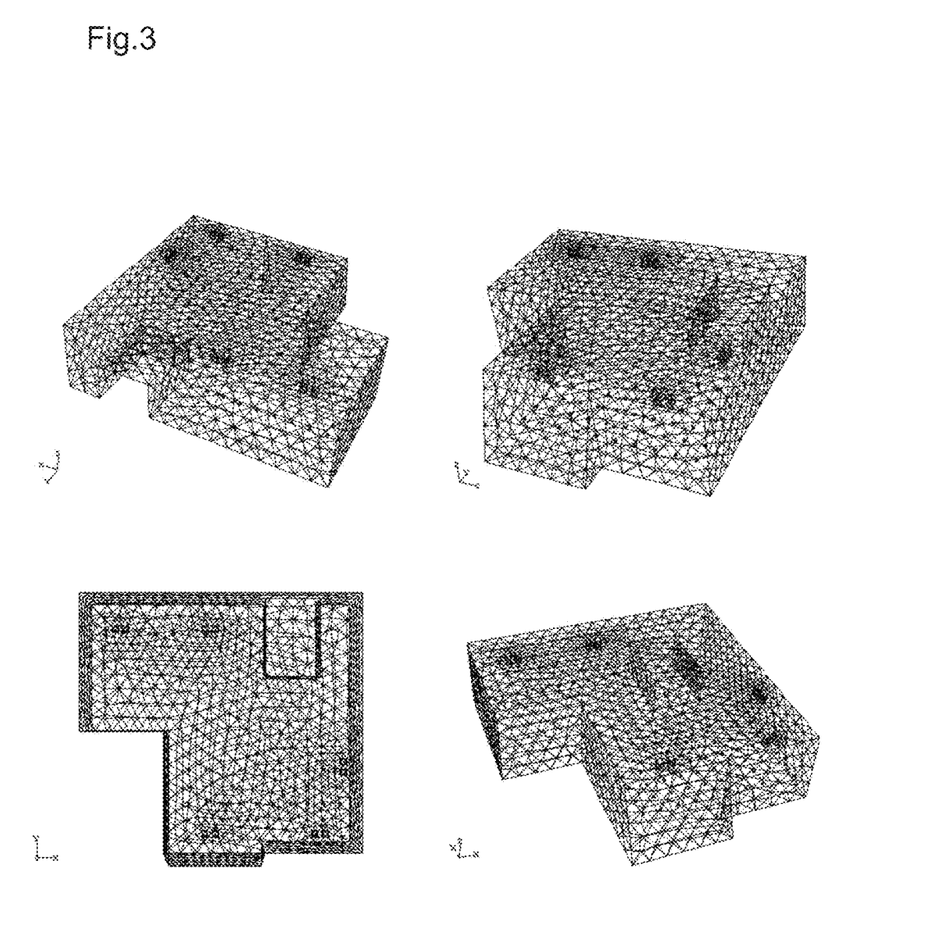
FIG. 3 illustrates an example of a meshed study environment by a finite number of individual volumes called meshes and whose sum forms the entirety of the environment.

As in a conventional CFD process, the determination of these primitive variables for the study environment relies on the discretization of space. To do this, the second stage E2 of the process according to the invention consists in creating in the study environment at least one mesh network called a matrix.

By definition, the term "mesh" refers to an individual volume-type element in which the values of the primitive variables (V, T, P) (velocity, temperature, pressure) are calculated. By extension, the term "meshing" refers to the space formed by the union of all of the meshes.

Preferably, in this stage E2, a network of cells called a grid is also created.

The grid is a network of cells in two dimensions covering the surfaces of the environment and its infrastructures. This grid can be generated by any suitable method, for example from the cloud of points provided by the 3D laser scanner after sweeps of the environment. The structural characteristics of the environment and aeraulic interfaces are associated with the grid.

The environment is then meshed by at least one network of a finite number of meshes whose sum provides the entirety of the study environment. This meshing will be called matrix below.

Preferably, two meshings are generated in the study environment, with said meshings being of different sizes and not stackable. The matrix then refers to these two meshings. It will clearly appear below that although the latter is not necessary for implementing the process, there is an advantage in working with two separate meshings, in particular in that during calculations, the second meshing is used as a control for the solution obtained in the first meshing and vice versa.

The matrix and the grid as described above and their generation in an environment are known to one skilled in the art. In particular, the meshing(s) can be hexahedral or tetrahedral according to the shape of the mesh comprising them. A meshing or a grid in an environment can be obtained in particular by using Delaunay triangulation.

The fineness of the meshing and the grid is left to the discretion of one skilled in the art and the user implementing the method, knowing that the smaller the mesh size, the more precise the result will be.

Once the grid and the matrix are created, it is necessary to determine the exclusion zones in the interior or on the periphery of the latter. These exclusion zones constitute zones in which neither calculation nor modeling will be carried out. It may involve in particular a closed volume placed inside the environment such as a cabinet, a cornerstone or any other infrastructure.

The object of the process according to the invention is therefore to evaluate the primitive variables in each of the meshes comprising the matrix. According to the process that is the object of the invention, this evaluation is done in two phases described below in detail as third and fourth stages E3 and E4 of the process.

In a third stage E3 of the process according to the invention, the primitive values (V, P, T) are first calculated in each of the meshes of the matrix in an irrotational field for a fluid that is assumed to be complete and incompressible.

For this stage E3 of the process, the fluid that occupies the environment is therefore assumed to be complete and incompressible, and for each mesh M of the matrix, $X_M$ refers to a primary primitive variable that can be calculated in the mesh M at point A. $X_M$ is determined by the infrastructures of the study environment. Preferably, point A is the center of the mesh M, but A can be any point of the mesh M.

The following is then calculated:

$$X'_M = \mathcal{F}(X_M)$$

where $\mathcal{F}$ is the function calculating the value $X'_M$ of the primary primitive variable $X_M$ in an irrotational field for a fluid that is assumed to be complete.

The function $\mathcal{F}$ is specific to the process according to the invention. For each mesh M of the matrix, it expresses for this mesh M the aeraulic result that is perceived as a weighted linear combination of all of the aeraulic interfaces of the environment that can influence this result. The fact of defining the function $\mathcal{F}$ only for an irrotational permanent field makes the linearity hypothesis valid. It can actually be demonstrated that a potential of the velocities $\phi(\vec{x},t)$ is defined on an irrotational and simply connected fluid area and that $\vec{v} = \overline{grad}(\Phi)$. It is advantageous to note that if $\phi_1$ and $\phi_2$ are two potentials in the same ranges, then $\phi_1 + \phi_2$ is also a potential in this range. In addition, if the fluid is incompressible, $\Phi$ satisfies Laplace's equation:

$$\nabla^2 \Phi = \text{div}\,\overline{\mathcal{F}}(\Phi)) = \partial^2 \Phi / \partial x_i^2 = 0.$$

Also, the function $\overline{grad}$ is defined by:

$$\mathcal{F}(X_M) = \sum_{i=1}^{n} p_i (x_i)_M$$

an equation in which $(x_i)_M$ is the value of the primary primitive variable $X_M$ at point A in the mesh M subjected to the influence of the aeraulic interface i; $p_i$ represents the weighting factor of the aeraulic interface i in the mesh M.

$(x_i)_M$ and $p_i$ are calculated in a known manner from technical characteristics of the aeraulic interfaces determined in the first stage E1 of the process according to the invention.

This third stage E3 of the process according to the invention makes it possible, for any mesh M of the calculation area, to determine a raw value $X'_M$ of the desired primitive variables. These values should then be refined by a calculation coupling the respective interactions between all of the aeraulic interfaces by this time no longer considering a complete and incompressible fluid but the primary fluid whose characteristics were determined in stage E1. This refining is done in a fourth stage E4 of the process according to the invention.

It should be noted that if the matrix consists of two or more meshings that are of a distinct size and that are not stackable, then the calculation of the third stage E3 of the process is carried out (simultaneously or not) in each of these meshings. As already mentioned above, this offers a possibility for control of the solution obtained at this stage. Actually, the convergence of the solutions that are obtained in each of the meshings makes it possible to ensure cohesion of the solution while the divergence of the solutions that are obtained can indicate that an error has occurred in the calculation.

The fourth stage E4 of the process according to the invention therefore consists in refining the raw value of the primitive variables $X'_M$ determined in the preceding stage E3.

To do this, the function $\mathcal{F}$ calculating the value $X''_M$ of the primitive variable $X''_M = \mathcal{F}(X_M)$ after "pressure-velocity" coupling and after introduction of a turbulence model adapted to the primary fluid occupying the study environment is defined. The selected model therefore depends on the primary fluid being considered. The model that is used in the case of air or a Newtonian fluid is based on the Navier-Stokes equations.

In its structure, the function $\mathcal{F}$ is comparable to the one integrated in the conventional CFD codes. The function $\mathcal{F}$ is a digitization of the Navier-Stokes equations managing the calculation of Newtonian and incompressible fluids and adapted to the matrix developed in the second stage E2 of the process.

This coupling stage first of all considers the equation for preserving the quantity of movement $$\rho \frac{\partial u}{\partial t} = -\nabla p + \mu \Delta u + F_B$$

whereas the equation of conservation of mass $\nabla \cdot u = 0$ is adopted for a control condition on which the convergence criterion relies.

For the digital calculation, each of these equations is discretized on the matrix, preferably on each of the two mesh networks constituting it, with said networks acting on the first order and on the second order.

The determination of the solutions follows the principle of Leray weak solutions defined in a Sobolev space.

This calculation is an iterative process for refining the values in each mesh based on the values calculated in the adjacent meshes until stabilized overall solutions are obtained.

Thus, at the end of this stage, an evaluation of the primitive value $X''_M$ at point A of the mesh M is obtained for any mesh M of the matrix. These primitive values therefore determine the aeraulic flows in the study environment.

The process according to the invention therefore makes it possible to initiate the standard phase for calculation of the CFD conventional solution by the function $\mathcal{F}$, a phase that constitutes the fourth stage E4 of the process according to the invention, on an approximate solution obtained by the function $\mathcal{F}$ developed on each mesh of the matrix constituting the calculation area. The process thus makes it possible to considerably reduce the number of iterations necessary to satisfy the criteria of acceptance of the solution and limits the risk of divergence of the calculation. Actually, in conventional CFD, the values of the primitive variables in a given mesh are conditioned only by the system of initial conditions and boundary conditions as well as by the code-specific models for which the user never has sufficient knowledge to be able to parameterize them adequately. It then appears that the value of the primitive variable of conventional CFD in any mesh inside the meshing area is primarily controlled by the conditions introduced by the operator responsible for calculation. Since the latter are most often determined on the border of the area, it immediately follows that the areas in which the interior volume increases faster than the surface of its border become both difficult to control (risk of obtaining a false solution due to lack of framing parameters) and slow to converge toward the accepted solution.

On the contrary, the process according to the invention ensures speed and relevance of the solution.

The first calculation stage E3 of the process according to the invention involving the function $\mathcal{F}$ makes it possible to obtain an enriched matrix providing improved initial conditions for launching the algorithm of the function $\mathcal{F}$.

The grid conditions transposed in the enriched matrix are reflected by the process according to the invention into initial dynamic characteristics in each mesh (stage E3). The principles of preserving the mass and of preserving the quantity of movement (contained in the Navier-Stokes equations) are then introduced into the calculation according to an iterative mode of coupling to close neighbors (stage E4); it should be noted that the process according to the invention makes a distinction between the neighbors of the first order and the neighbors of the upper order for increasing the convergence velocity of the solution. The iterative calculation is continued until a stable solution with the required precision is obtained.

Implementing stages E1 to E4 of the process according to the invention therefore makes it possible to model the aeraulic flows in a given environment and to calculate the flow of the homogeneous fluid in the study environment, with this flow being characterized by the calculated primitive values $X''_M$.

Once the aeraulic flows are modeled, it is possible to evaluate the risks of contamination in the study environment if a contaminant such as an airborne substance was dispersed there.

Below, it is assumed that the contaminant is an airborne substance.

Figure 4:
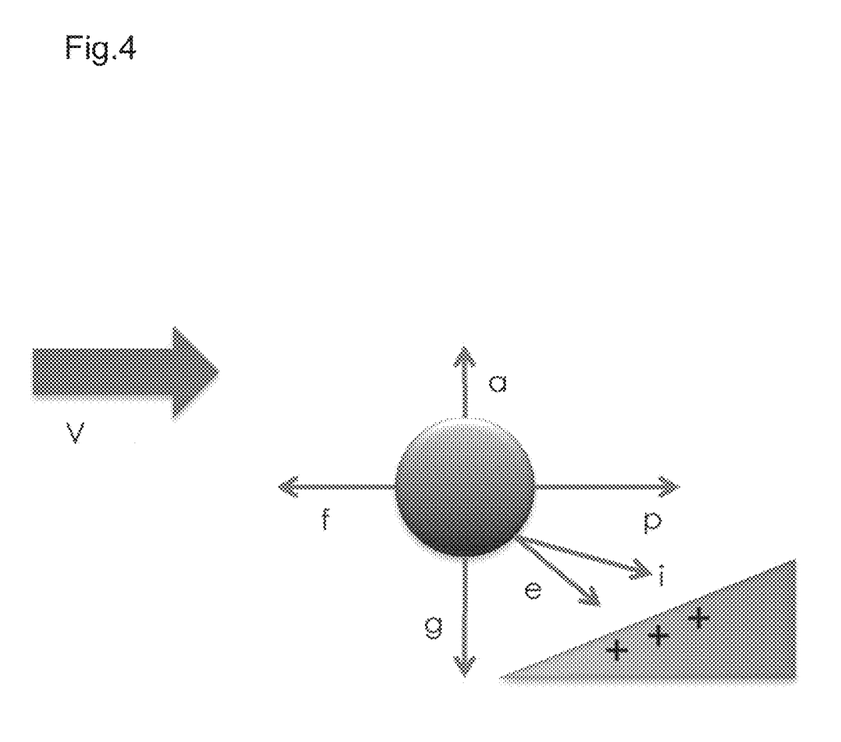
FIG. 4 illustrates the forces being exerted on a particle P of a contaminant dispersed into the primary fluid occupying the study environment.

To evaluate this risk, the process according to the invention also comprises a fifth stage E5 that consists of the acquisition of data relative to the contaminant. The primary parameters having to be taken into account are the nature of the contaminant, the point of emission defined relative to the meshings, the emission conditions (velocity, direction . . . ) as well as the contamination threshold or concentration 
boundary value, i.e., the level of contaminant presence in the primary fluid from which it is believed that there is contamination.

The sixth stage E6 of the process according to the invention consists in determining a qualitative diffusion profile of the contaminant in the environment knowing the modeling of the aeraulic flows in the environment obtained in the fourth stage E4 of the process.

The calculation of the diffusion or of the transport of airborne substances relies on the following assumptions:

An airborne substance can break down into a finite number of individual components called particles;

The flow model of the carrier fluid (primary fluid) is known in the vicinity of the particle. Actually, this model is obtained following stage E4 of the process according to the invention;

The movement of the particle is written as being the result of forces being applied on it; the force exerted by the carrier fluid is only one of them, and its intensity will depend on the physical characteristics of the particle. FIG. 4 illustrates said forces being exerted on a particle P:

g represents gravity, f represents friction, e represents a possible electrostatic force, a refers to buoyancy;

p refers to the thrust exerted by the aeraulic flow V in the environment on the particle;

i refers to an inertial force.

A new meshing is generated to follow the trajectories of the particles. This meshing of the contaminant only takes into account meshes of the matrix in which the contaminant has an impact.

This approach makes it possible to calculate the trajectories of the particles, having the characteristics of the contaminating airborne substance in a study environment, by drawing on the double advantage of having:

An initial state based on the result obtained in stage E4;

A meshing size and shape of the "auto-adaptive" contaminant providing precision close to the particle and less refined values beyond the direct sphere of influence of the airborne substance.

In addition, the property inherent to the process according to the invention to create an "auto-adaptive" meshing around the contaminant, i.e., a meshing whose boundaries are not predetermined, ensures that the solution will not remain confined in an imposed volume before launching the calculation but that only the grid representing the physical environment will limit its expansion.

On the practical plane, the process according to the invention makes possible the calculation of a dissemination of the airborne substance from a source determined by the user (including the uncertainty on the position of the point of origin) with the definition of concentration boundary value providing a risk of exposure in each mesh M of the matrix, for the zones inside the boundary envelope (i.e., for all of the zones except for the exclusion zones defined in stage E1).

To further increase the relevance of the calculated solution, when it is a matter of determining the plausible quantity of a given substance at a point in space, the process according to the invention produces a coupling of the Euler-Lagrange descriptions of the movement of particles of the airborne substance in the vector fluid.

In the description by Euler, by the resolution in stage E4 of the algorithm associated with the function N, the process according to the invention determines the zones and the voracity profiles of the aeraulic flow.

The process according to the invention records these singularities obtained during stage E4 and reintroduces them during stage E6 into the description by Lagrange for tracking boundary trajectories of the envelope of probability of the presence of the contaminant at the determined concentration threshold. For each singularity (voracity or knot of uncertainty), the process according to the invention determines the most unfavorable trajectory (i.e., the one that at most disperses the contaminating substance by remaining above the defined concentration threshold) and thus introduces the concept of the likelihood of contamination. Within the context of the process according to the invention, the likelihood is distinguished from the probability by the following concepts:

Probability expresses the fraction of certainty (for example on a scale of 0 to 1 or else on a scale of 0% to 100%) of having a quantity of product present at a given point;

Likelihood corresponds to a combination of conditional probabilities whose final result is a covering of the space of the study zone when the different parametric systems influencing the calculation of the probability have been compiled.

The process according to the invention integrates these schemes of uncertainty in the algorithm in the description by Lagrange for the determination of the envelope of risk produced. In this, the process according to the invention opens up the concept of the roCFD (roCFD: risk-oriented Computational Fluid Dynamics).

Thus, the implementation of stages E1 to E6 makes it possible to determine a qualitative diffusion profile of the airborne substance with the likelihood of contamination.

In addition, in a seventh stage E7, the process according to the invention makes it possible for the user to construct—wherever he desires in the study environment—a virtual volume in which the process according to the invention will make it possible to evaluate the quantity of stagnant material or material that passes through at a given instant as well as the likelihood of contamination on the basis of results obtained in stages E4 for the aeraulic flow and E6 for the diffusion profile of the contaminant. For example, in the case of the study of an environment in which a worker always occupies a fixed place, it is possible to construct a virtual volume at the position of the worker's head. The evaluation of the quantity of airborne substance that is stagnant or that passes through said volume will correspond to an evaluation of the quantity of substance inhaled by said worker. On the basis of this evaluation, it will be possible to determine whether or not it is necessary to test or to treat said worker.

The process according to the invention is preferably designed to model the aeraulic flows and the transport of airborne substances in a range of validity defined in the following manner:

The primary fluid is a Newtonian and incompressible gas;

The airborne substances are present in a small concentration, preferably less than 5% by mass in the primary fluid, and are:

Either miscible with the fluid (then considered as a Newtonian and incompressible gas);

Or heterogeneous and in this case, the substance should be such that the size of the particles comprising the airborne substance is:

Fairly large, preferably greater than 0.1 μm, so that the fluid can be considered as continuous on its scale;

Fairly small, preferably less than 1.000 µm, so that the trajectory of the substance can be influenced by the characteristics of the fluid in movement in which this substance is found.

The process according to the invention is specifically parameterized to provide reliable results in this range of validity, provided that the conceptual basis of the process according to the invention is not limited to this single range. Other applications can actually be considered, such as water, nanoparticles, mixtures inside a reactor . . . . It is enough to consider the equations of the state of corresponding fluid dynamics for and on behalf of Navier-Stokes.

The process according to the invention can advantageously be implemented by computer. Thus, the invention also has as its object a computer program or a set of computer programs or a computerized system for, once the program is implemented in a processor, modeling the aeraulic flows in an environment. Said program comprises in particular the instructions that are necessary for implementing the process according to the invention described above.

The program or the set of programs can comprise in particular
  The algorithms making it possible to model the study environment starting from essential data of the environment transmitted to the program by the user,
  The algorithms that make it possible to generate the grid and the matrix in the study environment according to the conditions that are defined by the user, and
  The algorithms for calculation making it possible to evaluate the primitive variables in the matrix according to the process and in particular stages E3 and E4 described above.

The program or the set of programs can also comprise
  The algorithms that are designed to evaluate the risks of contamination by a previously defined airborne substance and to define a qualitative diffusion profile of said substance, and
  The instructions or algorithms that make it possible for the user to determine a virtual volume in the environment and to evaluate the quantities of airborne substances that are stagnant or that pass through into said virtual volume at a given instant.

One skilled in the art obviously understands that relative to the algorithms or program for modeling the environment and for generating the meshing, any suitable algorithm can be used, in particular the algorithms or programs known by him.

The invention also has as its object a device for modeling aeraulic flows in an environment that comprises a processor that is programmed for implementing the process according to the invention.

The computer program as well as the device can also comprise display means for displaying the result obtained by the process according to the invention. Any suitable display mode of aeraulic flows can be implemented. Thus, the modeling of the aeraulic flow in the environment can be represented by, for example, graphic elements indicating the calculation point, the direction, and the velocity of the flow.

FIGS. 5a to 5d illustrate an application example of the process according to the invention implemented by computer.

The computerized system is suitable for parameterizing and processing input data necessary for the calculation: data relative to the environment, to the aeraulic interfaces, to the primary fluid and optionally to the contaminant, boundaries of the calculation area. Once all of the data necessary for the implementation of the process transmitted to the system, the latter can carry out the calculations (stages E2 to E6 of the process).

Figure 5A:
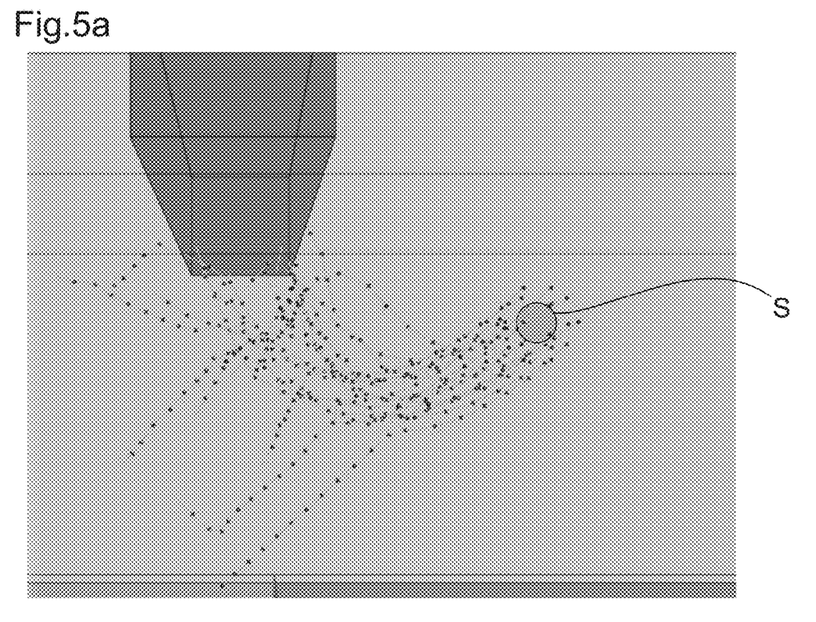
FIG. 5a illustrates a qualitative dispersion profile of an airborne substance in a study environment, with the profile being represented by a set of points.
Figure 5B:
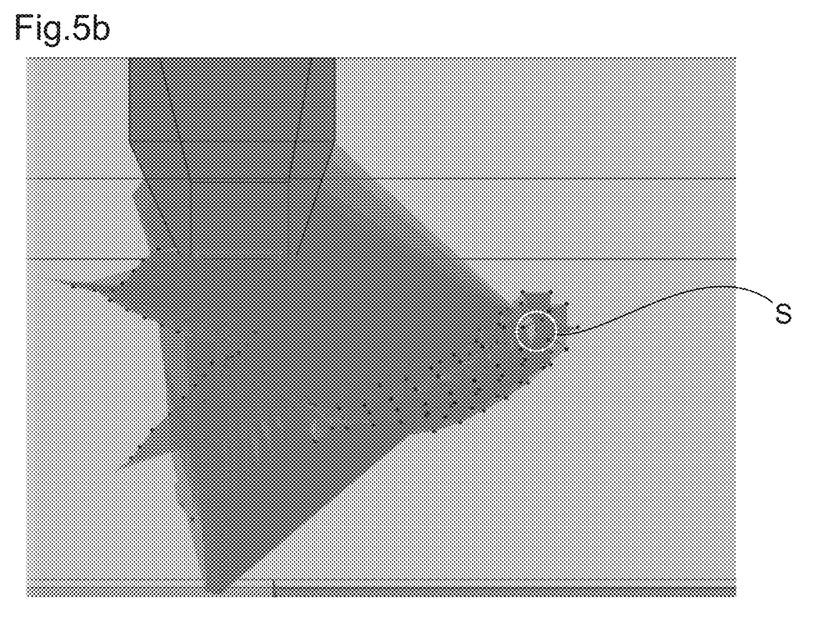
FIG. 5b illustrates the same qualitative dispersion profile as the one of FIG. 5a but this time being represented by a volume in three dimensions or "cloud.

In the example illustrated in FIGS. 5a to 5d, a profile for dispersion of an airborne substance was determined after calculation of the aeraulic flows in the study environment. The results of the calculations can be displayed by the computerized system in different forms. FIG. 5a illustrates the diffusion profile of the airborne substance at a given instant in the form of a cloud of points from the source of the substance S. FIG. 5b illustrates a diffusion profile of the same substance but this time in the form of a volume in three dimensions representing the dispersion over time and whose interior is evaluated as having a substance concentration that is higher than the fixed boundary threshold. In FIG. 5b, said volume is superimposed on the cloud of points of FIG. 5a. Finally, in FIGS. 5c and 5d, the dispersion profile of the airborne substance is superimposed on the model of aeraulic flow of the environment. In these figures, the flow model is represented by graphic elements bearing the following information:
  The point of the environment in which the aeraulic flow was calculated,
  The direction of said flow,
  The velocity of said flow determined by a color scale.

Figure 5C:
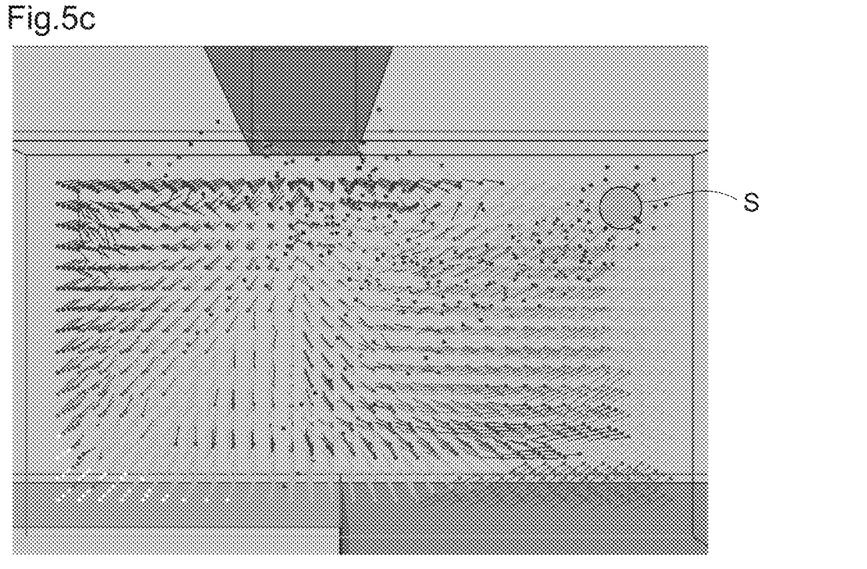
" FIGS. 5c and 5d always illustrate the same qualitative dispersion profile as the one illustrated in FIG. 5b but superimposed on a modeling of aeraulic flows in the study environment.
Figure 5D:
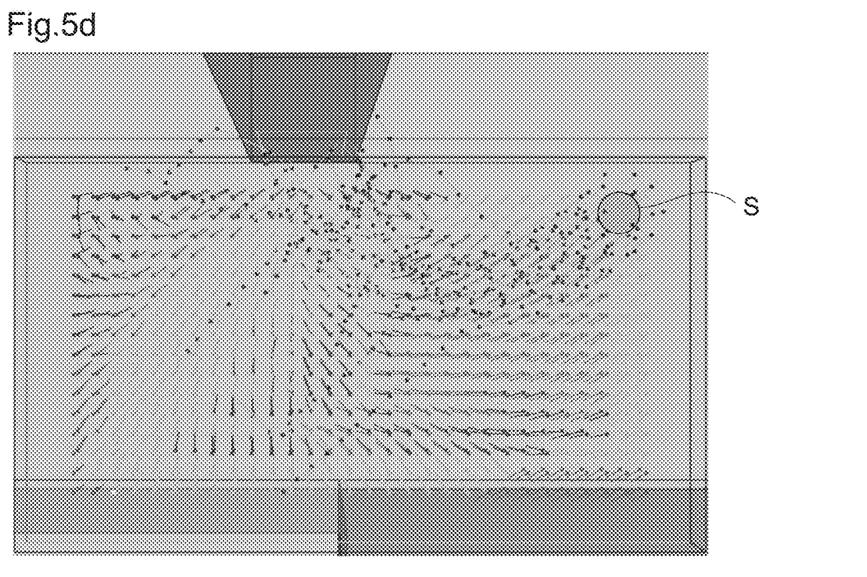

The difference between FIGS. 5c and 5d lies in the number of points at which the aeraulic flows were calculated: there are more points in FIG. 5c.

The process according to the invention was described above only by way of example. In particular, the process was described in the case where the primary fluid occupying the study environment is air. It goes without saying that the process is in particular applicable to any incompressible Newtonian fluid.

Likewise, the process according to the invention was described in the case where the study environment is an inside environment. However, the process according to the invention is also applicable for an outside environment provided that the conditions that have an influence on the aeraulic flows are known and controlled.

Likewise, one skilled in the art obviously understands that the process according to the invention is applicable to the case where the contaminant is diffused from several sources provided that the containment flows are adequately diluted. Actually, it is then possible to assume that the total flow of contaminant at point A is equal to the sum of the flows coming from different sources at this point.

The advantage of the process according to the invention is twofold:
  By the optimal use of memory blocks and by the reduction in the number of iterations necessary to solve the singularity equations, the process according to the invention implemented by computer reduces the calculating time while also meeting the objective of risk management;
  By the introduction of the concept of likelihood, the process according to the invention meets specifically the expectations of individuals responsible for safety and the prevention of the risk of airborne contamination by determining the zones that are certainly not contaminated, and therefore safe, by subtracting the zones of likelihood of presence.

This method marks a clear break with all of the approaches by calculation implemented in the field of modeling aeraulic flows.

Actually, this method offers the advantages:
Of calculating speed by the reduction in the number of iterations necessary for satisfying convergence criteria;
Of controlling the purely mathematical solution by the integration of available technical knowledge;
Of the explicit nature for the user of parameterizations required by the code for defining the calculating environment;
Of the automatic adaptation of the spatial volume in which the likelihood of presence and the associated concentration for a given contaminant in each individual mesh of the area are quantified.

In addition, the process according to the invention can therefore advantageously be implemented by computer.

None of the references of the prior art describes or mentions a principle that is comparable to that of this inventive process to make possible, at any point of the range considered, a quantitative determination of the likelihood of finding an airborne material at this point. This quantitative determination having, moreover, to be implementable by a person on the spot who is not necessarily a CFD modeling expert, and the results to be obtained in a phase compatible with the constraints of a routine use.

The applications of such a process relate in particular to defense, the protection of sensitive installations, hospitals, clean rooms, sites with a controlled environment, and the following industries: chemical, pharmaceutical, cosmetic, electronic, agricultural, and mechanical.

The invention claimed is:

1. A process, to be carried out by a computing device that includes at least a processor and a memory having program code stored therein that is read and executed by the processor, for modeling aeraulic flows in a study environment occupied by a primary fluid, the process comprising:
    a) generating and visualizing a 3D model of the study environment, the model including essential characteristics of infrastructures and aeraulic interfaces of the study environment and of the primary fluid occupying said study environment, the essential characteristics including contribution of each aeraulic interface at a given point of the study environment, said contribution defining primary primitive variables (E1);
    b) constructing, in the 3D model of the study environment, at least one meshing consisting of a finite number of meshes representing individual volumes, where a sum of said individual volumes represents an entirety of the 3D model of the study environment (E2);
    c) providing and displaying for each of the meshes of the meshing in the 3D model of the study environment an aeraulic flow model/result that includes a first value of primitive variables representing the aeraulic flows in the study environment, said first value of the primitive variables being calculated by determining for a fluid, assumed to be complete and incompressible, an influence of all the aeraulic interfaces of the study environment on the primary primitive variables determined by the infrastructure and aeraulic interfaces of the study environment and provided in the 3D model of the study environment (E3); and
    d) providing and displaying a model of the aeraulic flows in the study environment by displaying in the 3D model of the study environment and, for each of the meshes, the primitive variables modeling the aeraulic flows in the study environment, said primitive variables being calculated by discretizing on the meshing equations of state of fluid dynamics corresponding to the primary fluid, with the first values of the primitive variables calculated in the preceding stage being considered as initial conditions for said equations (E4).

2. The process according to claim 1, wherein stage a) further comprises at least one sweep of the study environment using a three-dimensional (3D) laser scanner for obtaining a 3D model of the study environment in the form of a cloud of points in three dimensions.

3. The process according to claim 1,
    wherein stage b) comprises the construction in the 3D model of the study environment of two separate meshings, said two meshings being not stackable and being of different sizes, and
    wherein stages c) and d) are implemented on each of the meshings.

4. The process according to claim 1, wherein said first values of the primitive variables, provided in stage c) and denoted $X'_M$ for each mesh M of the meshing, are obtained by solving the equation $X'_M = \mathcal{F}(X_M)$ in which the function $\mathcal{F}$ is provided by $$\mathcal{F}(X_M) = \sum_{i=1}^{n} p_i(x_i)_M$$

where
    $X_M$ refers to the primary primitive variable in the mesh M of the meshing for a fluid assumed to be complete and incompressible;
    $(x_i)_M$ is the value of the primary primitive variable $X_M$ in the mesh M subjected to the influence of the aeraulic interface i, with i varying from 1 to the number of aeraulic interfaces in the environment; and
    $P_i$ represents the weighting factor of the aeraulic interface i in the mesh M, with i varying from 1 to the number of aeraulic interfaces in the environment,
    with $(x_i)_M$ and $P_i$ being determined from characteristics of the aeraulic interfaces determined in stage a).

5. The process according to claim 1, further comprising:
    e) providing essential characteristics of an airborne substance flowing in the study environment;
    f) calculating a dispersion profile of the airborne substance from a source determined in the environment; and
    g) determining a risk of exposure (likelihood of contamination) in each mesh of the meshing according to a boundary concentration value of the substance.

6. The process according to claim 5, wherein the essential characteristics of the airborne substance comprise physical characteristics of the airborne substance and the initial conditions of dispersion of the airborne substance in the environment, as well as the boundary concentration value before contamination.

7. The process according to claim 5, in which stage f) further comprises the construction of an adaptive meshing around the airborne substance, with the adaptive meshing being constructed so as to calculate precise values close to the substance and less refined values beyond a direct sphere of influence of the airborne substance.

8. The process according to claim 5, further comprising:
    h) constructing a virtual volume in the 3D model of the study environment and determining therein a qualitative dispersion profile of the airborne substance.

9. The process according to claim 5, wherein the airborne substances are present at a concentration of less than 5% by mass in the primary fluid.

10. The process according to claim 5, wherein the airborne substance is miscible in the primary fluid, with said fluid being a Newtonian and incompressible gas.

11. The process according to claim 5, wherein the airborne substances are heterogeneous, and a size of the particles is between 0.1 and 1,000 µm.

12. The process according to claim 1, wherein the primary fluid occupying the study environment is a Newtonian and incompressible gas.

13. The process according to claim 1, wherein the primary fluid occupying the environment is air.

14. The process according to claim 1, wherein the study environment is an inside environment.

15. The process according to claim 2, wherein stage b) comprises the construction in the 3D model of the study environment of two separate meshings, not stackable, and whose meshes are of different sizes and in which stages c) and d) are implemented on each of the meshings, simultaneously or not.

16. A non-transitory computer readable medium on which is stored a computer program for modeling aeraulic flows in an environment occupied by a primary fluid, comprising instructions that, upon execution by a processor of the computer, causes the computer to:
  i. generate and visualize a 3D model of the study environment, the model including essential characteristics of infrastructures and aeraulic interfaces of the study environment and of the primary fluid occupying said study environment, the essential characteristics including contribution of each aeraulic interface at a given point of the study environment, said contribution defining primary primitive variables (E1);
  ii. construct, in the 3D model of the study environment, at least one meshing consisting of a finite number of meshes representing individual volumes, where a sum of said individual volumes represents an entirety of the study environment (E2);
  iii. provide and display, for each of the meshes of the meshing in the 3D model of the study environment, aeraulic flow model/result that includes a first value of primitive variables representing the aeraulic flows in the study environment, said first value of the primitive variables being calculated by determining for a fluid, assumed to be complete and incompressible, an influence of all the aeraulic interfaces of the study environment on the primary primitive variables determined by the infrastructure and aeraulic interfaces of the study environment and provided in the 3D model of the study environment (E3); and
  iv. provide and display a model of the aeraulic flows in the study environment by displaying in the 3D model of the study environment and, for each of the meshes, the primitive variables modeling the aeraulic flows in the study environment, said primitive variables being calculated by discretizing on the meshing equations of state of fluid dynamics corresponding to the primary fluid, with the first values of the primitive variables calculated in the preceding stage being considered as initial conditions for said equations (E4).

17. A device for modeling aeraulic flows in an environment occupied by a primary fluid comprising:
a processor; and
a memory, in communication with the processor, having program code stored therein that, upon execution by the processor, causes the processor to:
  i. generate and visualize a 3D model of the study environment, the model including essential characteristics of infrastructures and aeraulic interfaces of the study environment and of the primary fluid occupying said study environment, the essential characteristics including contribution of each aeraulic interface at a given point of the study environment, said contribution defining primary primitive variables (E1);
  ii. construct, in the 3D model of the study environment, at least one meshing consisting of a finite number of meshes representing individual volumes, where a sum of said individual volumes represents an entirety of the study environment (E2);
  iii. provide and display, for each of the meshes of the meshing in the 3D model of the study environment, aeraulic flow model/result that includes a first value of primitive variables representing the aeraulic flows in the study environment, said first value of the primitive variables being calculated by determining for a fluid, assumed to be complete and incompressible, an influence of all the aeraulic interfaces of the study environment on the primary primitive variables determined by the infrastructure and aeraulic interfaces of the study environment and provided in the 3D model of the study environment (E3); and
  iv. provide and display a model of the aeraulic flows in the study environment by displaying in the 3D model of the study environment and, for each of the meshes, the primitive variables modeling the aeraulic flows in the study environment, said primitive variables being calculated by discretizing on the meshing equations of state of fluid dynamics corresponding to the primary fluid, with the first values of the primitive variables calculated in the preceding stage being considered as initial conditions for said equations (E4).

18. The device according to claim 17, further comprising:
display means that displays the calculated primitive variables in the form of graphic elements that can be interpreted.

19. The device according to claim 17, wherein the program code further causes the processor to:
  v. provide essential characteristics of an airborne substance flowing in the study environment;
  vi. calculate a dispersion profile of the airborne substance from a source determined in the environment; and
  vii. determine a risk of exposure (likelihood of contamination) in each mesh of the meshing according to a boundary concentration value of the substance.

* * * * *